United States Patent
Chen et al.

(10) Patent No.: US 10,986,040 B2
(45) Date of Patent: Apr. 20, 2021

(54) NETWORK COMMUNICATION APPARATUS AND METHOD OF THE SAME

(71) Applicant: Realtek Semiconductor Corporation, Hsinchu (TW)

(72) Inventors: Chien-Ting Chen, Tainan (TW); Ying-An Huang, Taichung (TW); Meng-Hung Tsai, Toufen (TW); Chih-Jung Chiang, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 19 days.

(21) Appl. No.: 16/691,864

(22) Filed: Nov. 22, 2019

(65) Prior Publication Data
US 2020/0169515 A1 May 28, 2020

(30) Foreign Application Priority Data
Nov. 23, 2018 (TW) .................................. 107141940

(51) Int. Cl.
*H04L 12/28* (2006.01)
*H04L 12/935* (2013.01)
*H04L 29/06* (2006.01)

(52) U.S. Cl.
CPC .......... *H04L 49/3054* (2013.01); *H04L 69/24* (2013.01)

(58) Field of Classification Search
CPC ...... H04L 49/3054; H04L 69/24; H04L 29/06
See application file for complete search history.

(56) References Cited

U.S. PATENT DOCUMENTS

| 5,883,894 A * | 3/1999 | Patel ...................... H04L 29/06 370/438 |
| 6,504,849 B1 * | 1/2003 | Wang ................ H04L 12/40136 370/455 |
| 2004/0165530 A1 * | 8/2004 | Bedekar .................. H04L 49/90 370/235 |
| 2005/0010649 A1 * | 1/2005 | Payne .................... H04N 7/186 709/217 |
| 2006/0242669 A1 * | 10/2006 | Wogsberg ................ H04N 7/18 725/74 |

(Continued)

FOREIGN PATENT DOCUMENTS

TW 200735575 A 9/2007

*Primary Examiner* — Elisabeth Benoit Magloire
(74) *Attorney, Agent, or Firm* — Locke Lord LLP; Tim Tingkang Xia, Esq.

(57) ABSTRACT

A network communication method used in a network communication apparatus is provided that includes the steps outlined below. An external network communication apparatus is electrically coupled through a communication path. A communication capability packet is transmitted to the external network communication apparatus. Whether an acknowledgement packet from the external network communication apparatus is received through the communication path is determined. When the acknowledgement packet is not received, a single direction communication is performed within any single time period by using a time division communication mechanism such that an auto negotiation process is performed by exchanging the communication capability packet and the acknowledgement packet of both of the network communication apparatus and the external network communication apparatus.

10 Claims, 3 Drawing Sheets

(56) References Cited

U.S. PATENT DOCUMENTS

| | | | |
|---|---|---|---|
| 2006/0246908 A1* | 11/2006 | Petermann | H04W 84/14 455/444 |
| 2009/0013095 A1* | 1/2009 | Butcher | H04N 21/43615 710/11 |
| 2009/0097442 A1* | 4/2009 | Diab | H04L 12/40136 370/329 |
| 2015/0078351 A1* | 3/2015 | An | H04W 72/1268 370/336 |
| 2019/0074849 A1* | 3/2019 | Zhu | H04L 1/0041 |

* cited by examiner

NETWORK COMMUNICATION APPARATUS AND METHOD OF THE SAME

RELATED APPLICATIONS

This application claims priority to Taiwan Application Serial Number 107141940, filed Nov. 23, 2018, which is herein incorporated by reference.

BACKGROUND

Field of Invention

The present invention relates to a network communication technology. More particularly, the present invention relates to a network communication apparatus and a network communication method.

Description of Related Art

Ethernet is a computer area network technology. IEEE 802.3 standard from the organization IEEE sets the technology standard of the Ethernet, including the connection and the electronic signals of the physical layer and the content of the media access layer protocol. Ethernet is the most used area network technology and is widely adapted in the network used in daily life by the public.

The auto negotiation mechanism of Ethernet allows two electronic apparatus perform negotiation through two twisted pairs such that the communication can be performed after the negotiation is finished. However, part of the wires for connecting electronic apparatus may include only one twisted pair. Under such a condition, the negotiation can not be performed such that the communication is not able to be performed between the electronic apparatus.

Accordingly, what is needed is a network communication apparatus and a network communication method to address the issues mentioned above.

SUMMARY

An aspect of the present invention is to provide a network communication method capable for use in a network communication apparatus that includes the steps outlined below. An external network communication apparatus is electrically coupled through a communication path. A communication capability packet is transmitted to the external network communication apparatus. Whether an acknowledgement packet from the external network communication apparatus is received through the communication path is determined. When the acknowledgement packet is not received, a single way communication with the external network communication apparatus is performed in any single time period by a time division communication mechanism for performing an auto negotiation process that exchanges the communication capability packet and the acknowledgement packet between the network communication apparatus and the external network communication apparatus.

Another aspect of the present invention is to provide a network communication apparatus that includes a storage module and a processing module. The storage module is capable for storing a plurality of computer executable commands. The processing module is electrically coupled to the storage module and is capable for retrieving and executing the computer executable commands for executing the steps outlined below. An external network communication apparatus is electrically coupled through a communication path. A communication capability packet is transmitted to the external network communication apparatus. Whether an acknowledgement packet from the external network communication apparatus is received through the communication path is determined. When the acknowledgement packet is not received, a single way communication with the external network communication apparatus is performed in any single time period by a time division communication mechanism for performing an auto negotiation process that exchanges the communication capability packet and the acknowledgement packet of both of the network communication apparatus and the external network communication apparatus.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
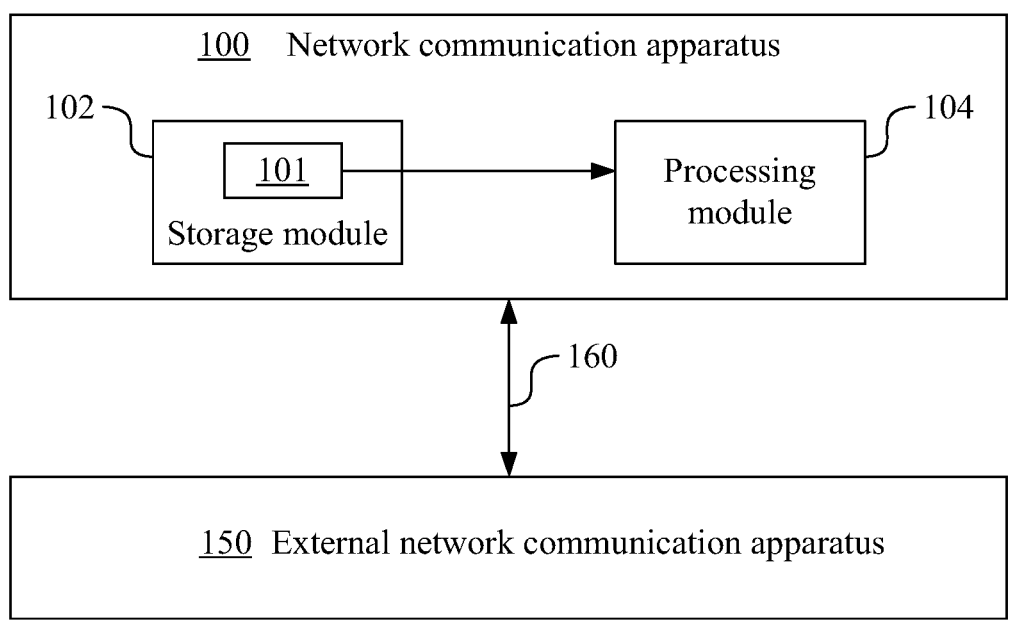
FIG. 1 is a block diagram of a computer system in an embodiment of the present invention.

Reference is made to FIG. 1. FIG. 1 is a block diagram of a network communication apparatus 100 and an external network communication apparatus 150 in an embodiment of the present invention.

Each of the network communication apparatus 100 and the external network communication apparatus 150 is an electronic apparatus having communication capability. The network communication apparatus 100 is configured to be electrically coupled to the external network communication apparatus 150 through a communication path 160 to perform communication. The network communication apparatus 100 and the external network communication apparatus 150 can perform communication through such as, but not limited to Ethernet technology after being electrically coupled. Further, the communication path 160 may include one twisted pair or two twisted pairs.

The network communication apparatus 100 includes a storage module 102 and a processing module 104.

In an embodiment, the storage module 102 can be such as, but not limited to an optical compact disk, a random access memory, a read only memory, a software disk, a hard disk or a magnetic disk. The storage module 102 is capable for storing a plurality of computer executable commands 101.

The processing module 104 is electrically coupled to the storage module 102. In an embodiment, the processing module 104 is configured to retrieve and execute the computer executable commands 101 to further operation the function of the network communication apparatus 100.

Figure 2:
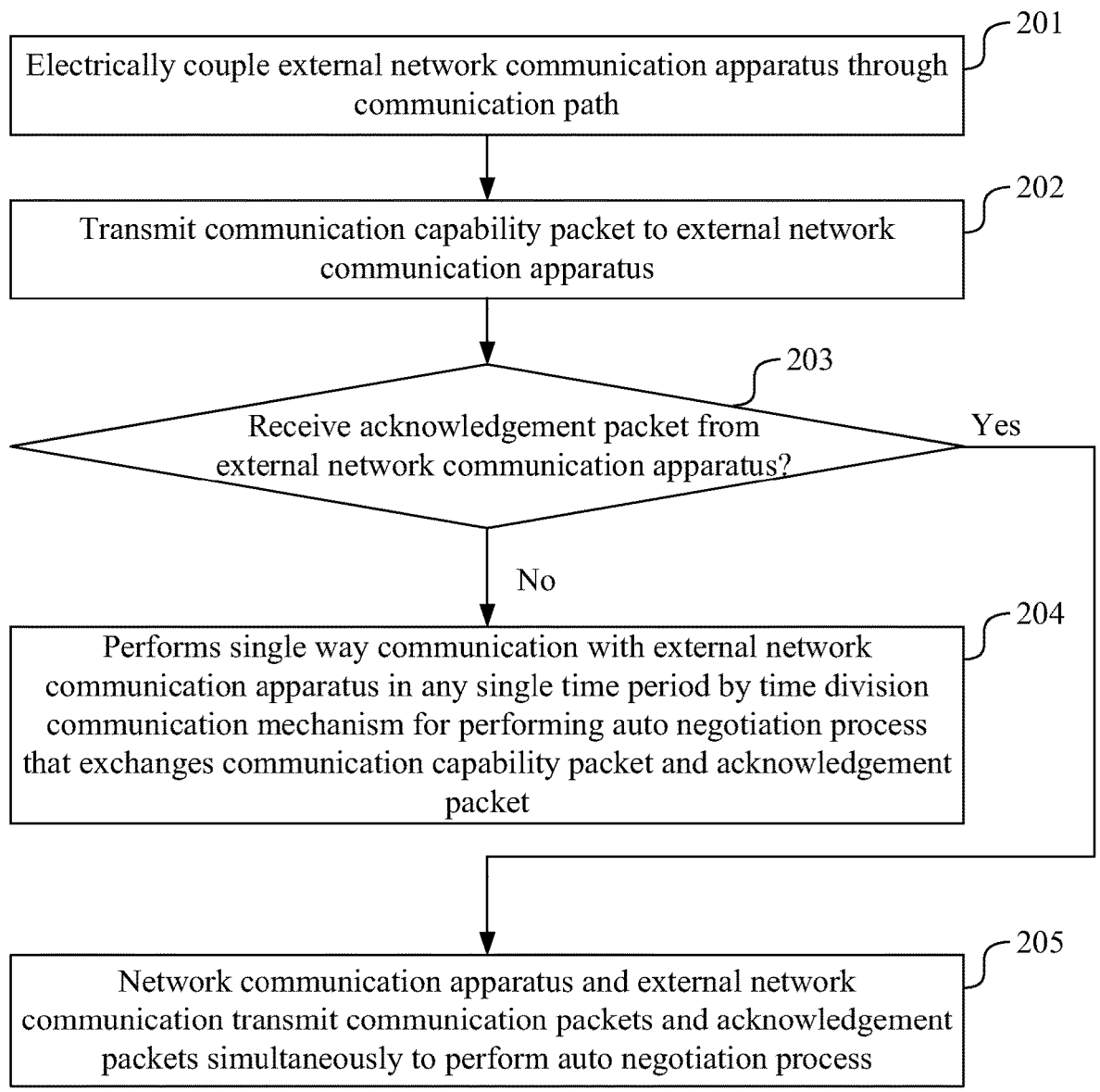
FIG. 2 is a flow chart of a network communication method in an embodiment of the present invention.
Figure 3:
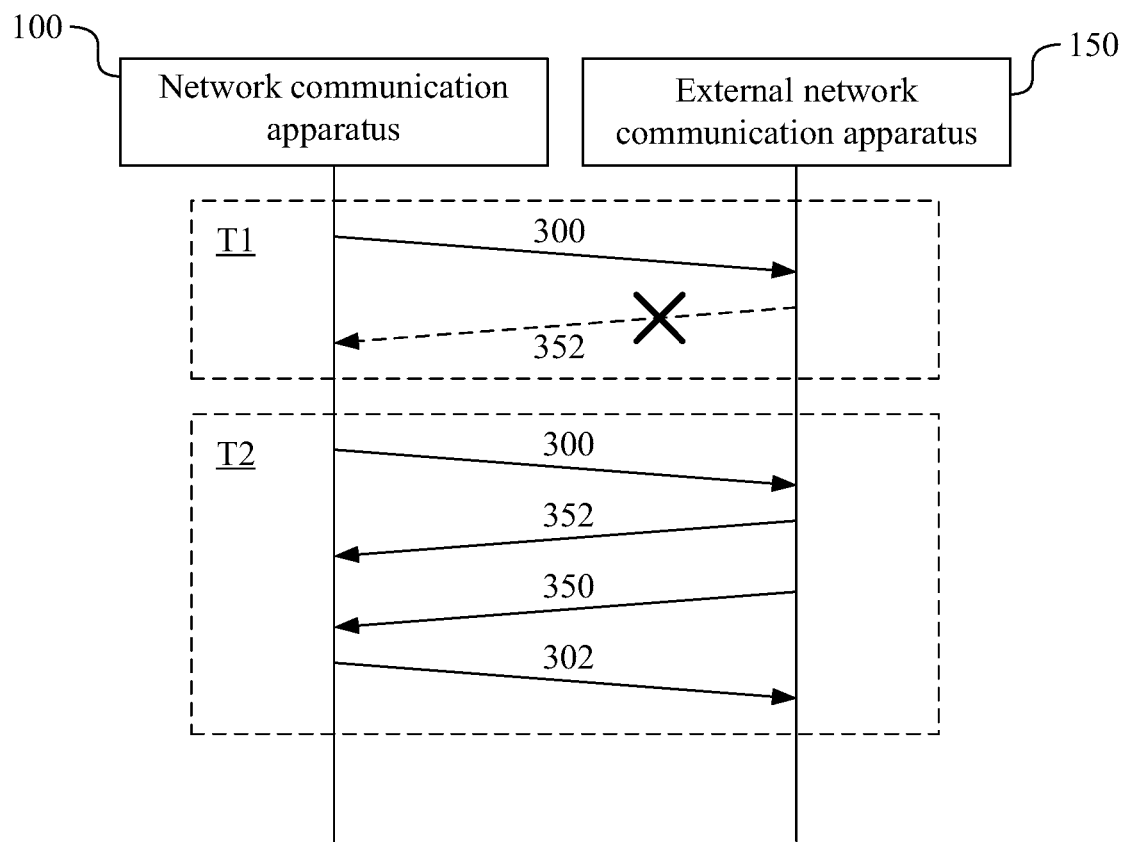
FIG. 3 is a timing diagram illustrating the exchange of the packets between the network communication apparatus and the external network communication apparatus in an embodiment of the present invention.

Reference is now made to FIG. 2 and FIG. 3 at the same time. The function of the network communication apparatus 100 is described in detail in the following paragraphs in accompany with FIG. 2 and FIG. 3.

FIG. 2 is a flow chart of a network communication method 200 in an embodiment of the present invention. The network communication method 200 can be used in the network communication apparatus 100 illustrated in FIG. 1.

FIG. 3 is a timing diagram illustrating the exchange of the packets between the network communication apparatus 100 and the external network communication apparatus 150 in an embodiment of the present invention.

The network communication method includes the steps outlined below (The steps are not recited in the sequence in which the operations are performed. That is, unless the sequence of the steps is expressly indicated, the sequence of the operations is interchangeable, and all or part of the steps may be simultaneously, partially simultaneously, or sequentially performed).

In step 201, the external network communication apparatus 150 is electrically coupled by the network communication apparatus 100 through the communication path 160.

In step 202, a communication capability packet 300 is transmitted to the external network communication apparatus 150 by the network communication apparatus 100. The communication capability packet 300 includes the information of the communication capability of the network communication apparatus 100 such as, but not limited to the information of the transmission speed supported by the network communication apparatus 100.

In step 203, whether an acknowledgement packet 352 from the external network communication apparatus 150 is received through the communication path 160 is determined by the network communication apparatus 100.

In an embodiment, when the communication path 160 includes two twisted pairs, the network communication apparatus 100 can perform the transmission and reception of the packets through a first twisted pair and a second twisted pair by using a transmission unit (TX, not illustrated) and a reception unit (RX, not illustrated) respectively.

On the other hand, the external network communication apparatus 150 can perform communication by using a reception unit thereof with the transmission unit of the network communication apparatus 100 to receive the packets. Further, the external network communication apparatus 150 can perform communication by using a transmission unit thereof with the reception unit of the network communication apparatus 100 to transmit the packets.

As a result, when the communication path 160 includes two twisted pairs, the network communication apparatus 100 can transmits the communication capability packet 300 to the external network communication apparatus 150 through the first twisted pair. After the external network communication apparatus 150 receives the communication capability packet 300, the network communication apparatus 100 can correspondingly receive the acknowledgement packet 352 from the external network communication apparatus 150 through the second twisted pair.

Similarly, the external network communication apparatus 150 can transmit the communication capability packet 350 to the network communication apparatus 100 through the second twisted pair. After the network communication apparatus 100 receives the communication capability packet 350, the external network communication apparatus 150 can correspondingly receive the acknowledgement packet 352 from the network communication apparatus 100 through the first twisted pair.

However, when the communication path 160 includes only one twisted pair, such twisted pair can either connect the transmission unit of the network communication apparatus 100 and the reception unit of the external network communication apparatus 150 or connect the reception unit of the network communication apparatus 100 and the transmission unit of the external network communication apparatus 150.

When only the transmission unit of the network communication apparatus 100 and the reception unit of the external network communication apparatus 150 are connected through the twisted pair, the network communication apparatus 100 is able to transmit the communication packet 300 to the external network communication apparatus 150. However, the network communication apparatus 100 is not able to receive the acknowledgement packet 352 from the external network communication apparatus 150 and is not able to receive the communication packet 350 from the external network communication apparatus 150 either.

When only the reception unit of the network communication apparatus 100 and the transmission unit of the external network communication apparatus 150 are connected through the twisted pair, the network communication apparatus 100 is able to receive the communication packet 350 to the external network communication apparatus 150. However, the network communication apparatus 100 is not able to transmit the communication capability packet 300 to the external network communication apparatus 150 and is therefore not able to receive the acknowledge packet 352 from the external network communication apparatus 150. Further, the network communication apparatus 100 is not able to respond to acknowledge packet corresponding to the communication packet 350 either.

As a result, in step 204, when the acknowledgement packet 352 is not received by the network communication apparatus 100 in the time period T1 in FIG. 3, the network communication apparatus 100 determines that the communication path 160 includes only one twisted pair. The network communication apparatus 100 performs a single way communication with the external network communication apparatus 150 in any single time period by a time division communication mechanism for performing an auto negotiation process that exchanges the communication capability packet and the acknowledgement packet of both of the network communication apparatus 100 and the external network communication apparatus 150.

As illustrated in FIG. 3, the auto negotiation process performed in the time period T2 can be started by transmitting the communication capability packet 300 to the external network communication apparatus 150 by the network communication apparatus 100 first. Subsequently, the external network communication apparatus 150 transmits the corresponding acknowledge packet 352 to the network communication apparatus 100 and then transmits the communication capability packet 350 to the network communication apparatus 100. Further, the network communication apparatus 100 transmits the acknowledge packet 302 to the external network communication apparatus 150 to finish the auto negotiation process.

The network communication apparatus 100 and the external network communication 150 determine a communication format used to perform communication according to the communication capability packet of each other. The format can be such as, but not limited to the transmission speed that is supported by both of the network communication apparatus 100 and the external network communication 150.

It is appreciated that the embodiment described above uses the order of transmitting the communication packet 300 by the network communication apparatus 100 first as an example. In other embodiments, the auto negotiation process can be started by transmitting the communication packet 350 by the external network communication 150 first.

When the network communication apparatus 100 receives the communication packet 350 and the acknowledgement packet 352, in step 205, two twisted pairs is determined to be included in the communication path 160. The network communication apparatus 100 and the external network communication 150 can transmit the communication packets 300 and 350 and the acknowledgement packets 302 and 352 simultaneously to perform the auto negotiation process.

The network communication apparatus 100 and the network communication method 200 of the present invention can determine the condition of the communication path 160 to perform the auto negotiation process in a time division communication mechanism when the bi-directional communication is not able to be performed through the communication path.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A network communication method capable for use in a network communication apparatus, comprising:
   electrically coupling to an external network communication apparatus through a communication path;
   transmitting a communication capability packet to the external network communication apparatus;
   determining whether an acknowledgement packet from the external network communication apparatus is received through the communication path; and
   when the acknowledgement packet is not received, performing a single way communication with the external network communication apparatus in any single time period by a time division communication mechanism for performing an auto negotiation process that exchanges the communication capability packet and the acknowledgement packet between the network communication apparatus and the external network communication apparatus.

2. The network communication method of claim 1, wherein the auto negotiation process comprises:
   transmitting the communication capability packet related to a first one of the network communication apparatus and the external network communication by the first one to a second one of the network communication apparatus and the external network communication;
   transmitting the corresponding acknowledgement packet by the second one to the first one;
   transmitting the communication capability packet related to the second one by the second one to the first one; and
   transmitting the corresponding acknowledgement packet by the first one to the second one.

3. The network communication method of claim 1, further comprising:
   determining a communication format used to perform communication by the network communication apparatus and the external network communication according to the communication capability packet of each other.

4. The network communication method of claim 1, further comprising:
   when the acknowledgement packet is received, transmitting the communication capability packet and the confirmation reception packet through the communication path by the network communication apparatus and the external network communication apparatus simultaneously to perform the auto negotiation process.

5. The network communication method of claim 1, further comprising:
   when the acknowledgement packet is not received, determining that the communication path comprises only a twisted pair; and
   when the acknowledgement packet is received, determining that the communication path comprises two twisted pairs.

6. A network communication apparatus, comprising:
   a storage module capable for storing a plurality of computer executable commands; and
   a processing module electrically coupled to the storage module and capable for retrieving and executing the computer executable commands for executing the steps of:
      electrically coupling to an external network communication apparatus through a communication path;
      transmitting a communication capability packet to the external network communication apparatus;
      determining whether an acknowledgement packet from the external network communication apparatus is received through the communication path; and
      when the acknowledgement packet is not received, performing a single way communication with the external network communication apparatus in any single time period by a time division communication mechanism for performing an auto negotiation process that exchanges the communication capability packet and the acknowledgement packet between the network communication apparatus and the external network communication apparatus.

7. The network communication apparatus of claim 6, wherein the auto negotiation process comprises:
   transmitting the communication capability packet related to a first one of the network communication apparatus and the external network communication by the first one to a second one of the network communication apparatus and the external network communication;
   transmitting the corresponding acknowledgement packet by the second one to the first one;
   transmitting the communication capability packet related to the second one by the second one to the first one; and
   transmitting the corresponding acknowledgement packet by the first one to the second one.

8. The network communication apparatus of claim 6, wherein the network communication method further comprises:
   determining a communication format used to perform communication by the network communication apparatus and the external network communication according to the communication capability packet of each other.

9. The network communication apparatus of claim 6, wherein the network communication method further comprises:
   when the acknowledgement packet is received, transmitting the communication capability packet and the confirmation reception packet through the communication path by the network communication apparatus and the external network communication apparatus simultaneously to perform the auto negotiation process.

10. The network communication apparatus of claim 6, wherein the network communication method further comprises:
   when the acknowledgement packet is not received, determining that the communication path comprises only a twisted pair; and
   when the acknowledgement packet is received, determining that the communication path comprises two twisted pairs.

\* \* \* \* \*